United States Patent
Gowan et al.

(10) Patent No.: US 6,241,325 B1
(45) Date of Patent: Jun. 5, 2001

(54) LOW-SPEED ANTISKID CONTROL FOR MULTIGAIN HYDRAULIC VALVE BRAKE SYSTEM

(75) Inventors: John J. Gowan, Mountlake Terrace; Thomas T. Griffith, Seattle, both of WA (US)

(73) Assignee: The Boeing Company, Seattle, WA (US)

( * ) Notice: Subject to any disclaimer, the term of this patent is extended or adjusted under 35 U.S.C. 154(b) by 46 days.

(21) Appl. No.: 08/950,130

(22) Filed: Oct. 14, 1997

(51) Int. Cl.[7] ........................................ B60T 8/68
(52) U.S. Cl. ............................................... 303/176
(58) Field of Search ................................ 303/176, 170, 303/126

(56) References Cited

U.S. PATENT DOCUMENTS

| | | |
|---|---|---|
| 2,794,609 | 6/1957 | Perry . |
| 3,724,916 | 4/1973 | Hirzel . |
| 3,861,759 * | 1/1975 | McNamara et al. ................. 303/176 |
| 3,948,569 | 4/1976 | Gentet et al. . |
| 4,006,941 | 2/1977 | DeVlieg . |
| 4,053,187 | 10/1977 | Cook . |
| 4,076,331 | 2/1978 | DeVlieg . |
| 4,120,540 | 10/1978 | Devlieg . |
| 4,125,234 | 11/1978 | Tregre . |
| 4,130,322 | 12/1978 | Cook . |
| 4,135,769 | 1/1979 | Williams et al. . |
| 4,180,223 | 12/1979 | Amberg . |
| 4,198,102 | 4/1980 | DeVlieg . |
| 4,205,735 | 6/1980 | Murray . |
| 4,221,350 | 9/1980 | Moser et al. . |
| 4,260,198 | 4/1981 | Cook . |
| 4,269,455 | 5/1981 | Beck et al. . |
| 4,323,969 | 4/1982 | Skarvada . |
| 4,327,414 | 4/1982 | Klein . |
| 4,338,667 | 7/1982 | Cook et al. . |
| 4,360,239 | 11/1982 | Boehringer . |
| 4,402,478 | 9/1983 | Martin . |
| 4,430,715 | 2/1984 | Gentet et al. . |
| 4,484,281 | 11/1984 | Skarvada . |
| 4,484,282 | 11/1984 | Cook et al. . |
| 4,485,445 * | 11/1984 | Braschel .............................. 303/176 |
| 4,523,633 | 6/1985 | Furukawa et al. . |
| 4,530,058 | 7/1985 | Cook et al. . |
| 4,562,542 | 12/1985 | Skarvada . |
| 4,613,190 | 9/1986 | Johnson . |
| 4,640,475 | 2/1987 | Zoerb . |
| 4,773,014 * | 9/1988 | Hagiya et al. ....................... 303/176 |
| 4,881,784 | 11/1989 | Leppek . |
| 4,923,056 | 5/1990 | Nedelk . |
| 5,171,070 * | 12/1992 | Okazaki et al. ..................... 303/176 |
| 5,209,329 * | 5/1993 | Sigl et al. ............................ 303/176 |
| 5,333,942 | 8/1994 | Peczkowski et al. . |
| 5,511,863 | 4/1996 | Suh . |
| 5,615,934 * | 4/1997 | Abuelsamid ........................ 303/176 |

FOREIGN PATENT DOCUMENTS

| | | |
|---|---|---|
| 555392 | 7/1932 | (DE) . |
| 1 756 129 | 2/1970 | (DE) . |

* cited by examiner

Primary Examiner—Matthew C. Graham
(74) Attorney, Agent, or Firm—Christensen O'Connor; Johnson Kindness PLLC

(57) ABSTRACT

A low-speed antiskid control for a multigain hydraulic valve brake system for an airplane is disclosed. The antiskid control includes low- and high-pressure bias modulation (PBM) high step thresholds. At high speeds the low PBM threshold is used to control a PBM high step firing. At low speeds, the high PBM threshold is used to prevent a PBM high step firing unless a deep skid is occurring. The use of a high threshold at low airplane speeds prevents a low speed control loss due to PBM high step firing reducing brake pressure to below minimum brake contact pressure.

2 Claims, 3 Drawing Sheets

LOW-SPEED ANTISKID CONTROL FOR MULTIGAIN HYDRAULIC VALVE BRAKE SYSTEM

FIELD OF THE INVENTION

This invention relates to brake control systems and, more particularly, to antiskid brake control systems.

BACKGROUND OF THE INVENTION

The brake systems of modem commercial airplanes are hydraulic and include electrically operated brake-metering valves, autobrake shuttle valves, and antiskid valves. The valves are controlled by an antiskid/autobrake control unit that produces and sends control signals to the valves of the brake system in accordance with a software program that responds to inputs from various sensors and control sources. Pilot instructions produced by the operation of brake pedals or an autobrake setting control the operation of the brake metering valves and the antiskid valves in a manner designed to decelerate an airplane in a smooth manner. The brake metering valves control brake pressure and the antiskid valves control the release of brake pressure in a manner designed to minimize wheel skidding.

It has been found that antiskid control software used to control antiskid/antibrake control units designed to interface with unigain antiskid hydraulic valves do not, at low speeds, function as well as desired when interfaced with multigain antiskid hydraulic valves. More specifically, antiskid hydraulic valves are controlled by antiskid pressure bias modulation (PBM) control current. PBM control currents are slow to achieve proper bias brake pressure levels when braking is initiated because PBM control currents are based on an integral control algorithm. The slowness in achieving proper bias brake pressure levels when braking is initiated has resulted in the incorporation of a PBM "high step" in antiskid control software that instantaneously increases the integrator to the proper value when braking is initiated. Such antiskid control software works satisfactorily when paired with a unigain antiskid hydraulic valve because a unigain antiskid hydraulic valve is supplied by a source of constant hydraulic pressure. As a result, brake pressure is a function of the PBM control current applied to the valve. In contrast, a multigain antiskid hydraulic valve is supplied with hydraulic pressure metered by the pilot. As a result, brake pressure depends upon both PBM control current and metered hydraulic pressure. If antiskid control is initiated at a low value of metered hydraulic pressure, which may occur when an airplane is taxiing into an airport gate, releasing too much brake pressure when the high step "fires" may result in a loss of braking. For example, in one aircraft, brake contact pressure is generally around 300 psig. If a pilot is metering 600 psig when a PBM high step fires, brake pressure may suddenly be reduced to 200 psig, a value below brake contact pressure. While this will not occur in a system that uses unigain antiskid hydraulic valves because the PBM high step will not release any brake pressure when metered pressure is low, it can occur in a system that uses multigain antiskid hydraulic valves.

The present invention is directed to providing an antiskid control system that eliminates the foregoing problem when interfaced with a multigain antiskid hydraulic valve.

SUMMARY OF THE INVENTION

In accordance with this invention, a low-speed antiskid control for a multigain hydraulic valve brake system is provided. The antiskid control includes low and high pressure bias modulation (PBM) high step thresholds. At high speeds, the low threshold is used, allowing a PBM high step to "fire" (or trigger) in a conventional manner. At low speeds the high threshold is used to prevent a PBM high step from firing unless a deep skid is occurring. The use of a high threshold at low speed prevents low speed control loss due to high step firing reducing brake pressure below minimum brake contact pressure.

In accordance with other aspects of this invention, the low-speed antiskid control is implemented as a modification to the software that controls the antiskid valves of an airplane brake system.

In accordance with further aspects of this invention, in a conventional manner, the antiskid software compares the measured true wheelspeed of the aircraft with a reference wheelspeed that is based on measured wheelspeed. The true wheelspeed is subtracted from the reference wheelspeed to determine slip velocity. Thereafter, also in a conventional manner, a test is made to determine if the slip velocity is above or below an ideal value. The integrator value is set based on the state of the slip velocity. Then, in accordance with the present invention, a test is made to determine if the wheelspeed is above or below a predetermined threshold. If the wheelspeed is above the threshold, the high PBM threshold is set. If the wheel speed is below the threshold, the low PBM threshold is set. Thereafter, again in a conventional manner, a test is made to determine if the antiskid current is above or below the PBM threshold. If the antiskid current is below the PBM threshold, the antiskid current is applied to the multigain antiskid hydraulic valve. If the antiskid current transitions from below to above the PBM threshold, a high step current is applied to the multigain antiskid hydraulic valve.

As will be readily appreciated from the foregoing description, the use of PBM dual thresholds eliminates the problems associated with combining an antiskid control system designed to interface with a unigain antiskid hydraulic valve when interfaced with a multigain antiskid hydraulic valve. At low speed, a high step will fire only if a deep skid is occurring. At low speed, a deep skid will only occur if the metered pressure is high enough to prevent a complete loss of braking if a high step fires. At higher speed, the high step will still function as normal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
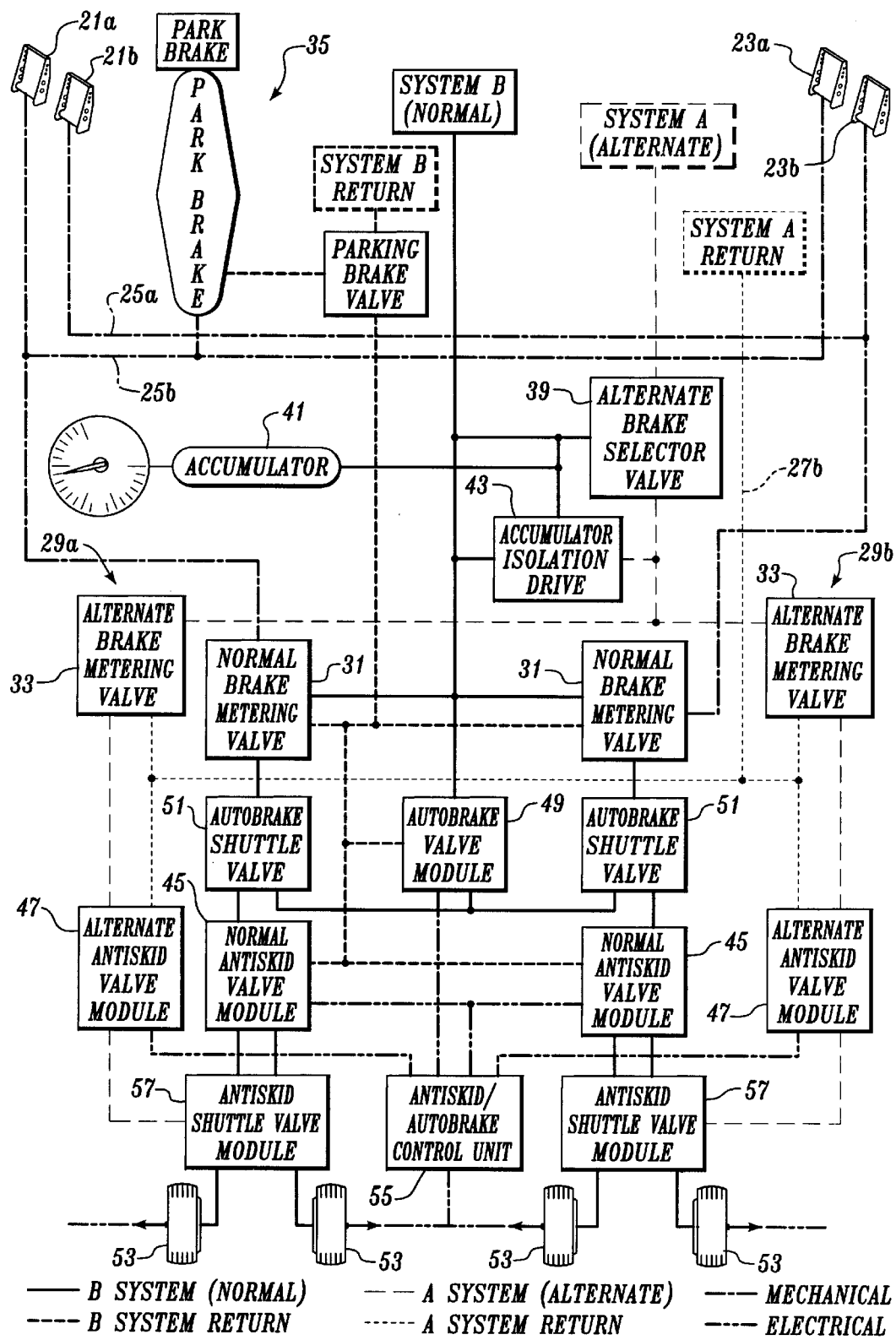
FIG. 1 is a block diagram of an exemplary airplane brake system.

FIG. 1 is a block diagram of a brake system for a contemporary commercial airplane such as the Boeing 737.

In order to provide full and differential braking capability, the brake system includes two sets of brake pedals. The captain's brake pedals 21a and 21b are connected to the first officer's brake pedals 23a and 23b by a bus bar and connecting linkage 25a and 25b. Cables 27a and 27b, located on the left and right sides of the airplane, connect the pedals 21a, 21b, 23a and 23b to brake-metering valve modules 29a and 29b located in each wheelwell. Each brake-metering module includes a normal brake-metering valve 31 and an alternate brake-metering valve 33. The normal brake-metering valves 31 form part of a normal brake system and the alternate brake-metering valves 33 form part of an alternate brake system. The normal brake system is used under normal conditions and the alternate brake system is used when the normal brake system fails. A parking brake lever 35 latches the brakes on when both brake pedals are fully depressed by either the captain or the first officer.

The normal brake system is powered by a normal hydraulic system designated system B. The alternate brake system is powered by an alternate hydraulic system designated system A. The alternate brake system is automatically selected by an automatic brake selector valve 39 when hydraulic power is lost by the normal hydraulic system, i.e., system B. An accumulator 41 in the normal brake system is automatically selected when both normal and alternate brake hydraulic power is lost. An accumulator isolation valve 43 isolates the accumulator 41 from the remainder of the system.

The normal and alternate brake-metering valves 31 and 33 control the amount of hydraulic system pressure applied to normal or alternate antiskid valve modules 45 and 47, respectively. Located between the normal brake metering valves 31 and the normal antiskid valve modules 45 on the right and left sides of the airplane are autobrake shuttle valves 51. The autobrake shuttle valves 51 are controlled by an autobrake valve module 49, which, in turn, is controlled by an antiskid/antibrake control unit 55. The normal antiskid valve modules 45 receive either normal brake metered pressure from the normal brake metering valves 31 or autobrake pressure from the autobrake valve module 49 and regulate the pressure applied by the brakes of the airplane wheels 53. The alternate antiskid valve modules 47 receive alternate brake pressure from the alternate brake metering valves 33 and regulate pressure to the brakes when, as noted above, the normal brake system fails.

An antiskid/autobrake control unit 55 sends electrical control signals to the antiskid valve modules 45 and the alternate antiskid valve modules 47 to control braking under skid conditions. The antiskid/autobrake control unit also sends electrical control signals to the autobrake valve module that causes brake pressure to be metered in a manner that maintains a preset deceleration. Wheelspeed transducers mounted in the axles of the wheels 53 produce the wheelspeed signals that are used by the software of the antiskid/autobrake control unit 55 to create the desired electrical control signals..

The antiskid system controls braking pressure in a manner that achieves maximum effectiveness in both automatic and manual brake operations under all runway conditions. In essence, the control signals release the brakes when a wheel skid is detected in order to reduce skidding. The antiskid/autobrake control unit receives input from a transducer associated with each of the four wheels shown in FIG. 1. The antiskid/antibrake control unit 55 uses these inputs to control the amount of brake pressure applied by the normal and alternate antiskid valve modules to the wheels via the antiskid shuttle valve modules 57. The antiskid system allows maximum braking without locking the wheels and provides hydroplane and touchdown protection.

The autobrake system provides automatic braking control by applying hydraulic brake pressure on landing or upon initiation of a refuse takeoff (RTO). The system operates with the normal antiskid system and at least one inertial reference system—normally the Airplane Data Inertial Reference Unit (ADIRU). The ADIRU is independent of the antiskid/autobrake control unit. The ADIRU uses accelerometers to determine airplane ground speed. The autobrake system brings an airplane to a complete stop unless it is disarmed by the pilot.

An autobrake selector switch (not shown) has five landing settings. Deceleration can be changed during roll-out. The autobrake system regulates brake pressure to control the overall deceleration of the airplane. The amount of brake pressure commanded will vary, depending upon decelerating forces. When the RTO position is selected before takeoff, maximum braking system pressure is applied to all wheels if both thrust levers are moved to idle during a takeoff roll. In some airplanes, during normal takeoff, the autobrake selector switch returns to an off position at lift-off. In other airplanes the autobrake selector switch does not return to an off position at lift-off.

In the past, many antiskid valves were unigain antiskid hydraulic valves and the software operating antiskid/autobrake control units was designed for interfacing with unigain antiskid hydraulic valves. Recently, unigain antiskid hydraulic valves have been replaced with multigain antiskid hydraulic valves in some airplanes. This replacement can present a problem if antiskid control is initiated at low speeds. In this regard, attention is directed to FIG. 2, which is a functional block diagram of antiskid control software incorporating the present invention. The first step, shown at block 61, is conventional--measuring true wheelspeed. This is accomplished by reading the previously described transducers mounted on the axles of the wheels 53. Thereafter, at block 63, as is also conventional, reference wheelspeed is determined. Reference wheelspeed is the speed of an unbraked wheel. This value is determined from the measured wheelspeed of the airplane using a well-known control algorithm. Thereafter, at block 65, the true wheelspeed is subtracted from the reference wheelspeed to determine slip velocity.

Next, a test is made to determine if the slip velocity is above a predetermined threshold. See block 67. If the slip velocity is too high, an integrator value is increased. If the slip velocity is low, the integrator value is decreased. See blocks 69 and 71, respectively. The integrator value is used by an integral-based antiskid control algorithm called the pressure bias modulation (PBM) antiskid control algorithm. Blocks 69 and 71 are also conventional.

Figure 2:
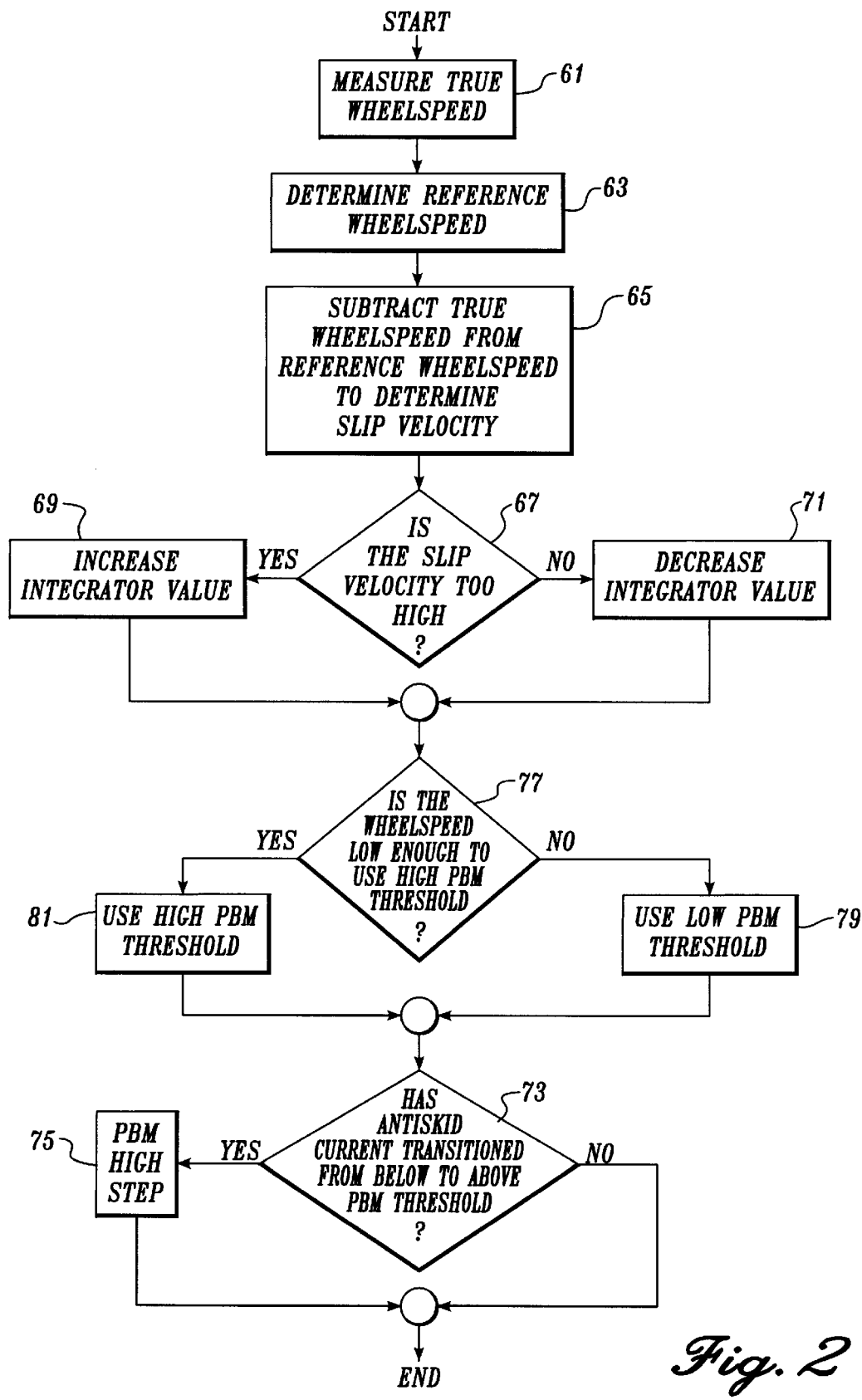
FIG. 2 is a functional block diagram of an antiskid control system software incorporating the present invention.
Figure 3:
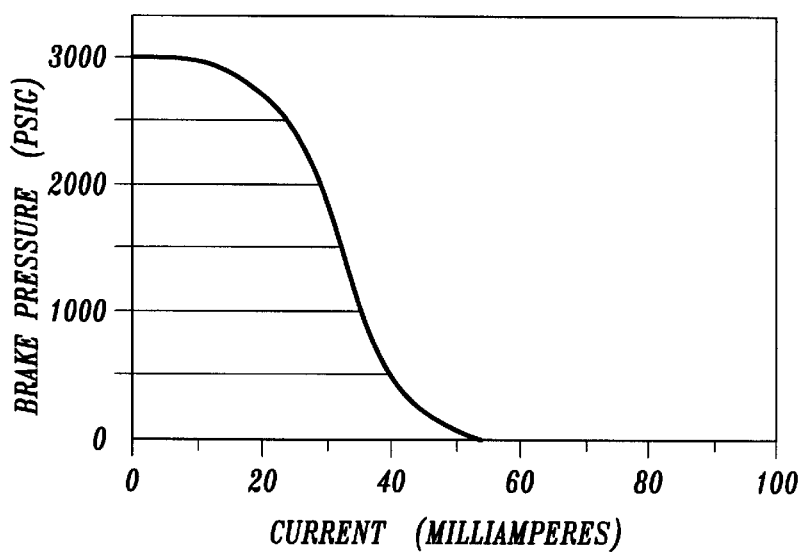
FIG. 3 is a brake pressure versus current diagram for a unigain antiskid hydraulic valve.
Figure 4:
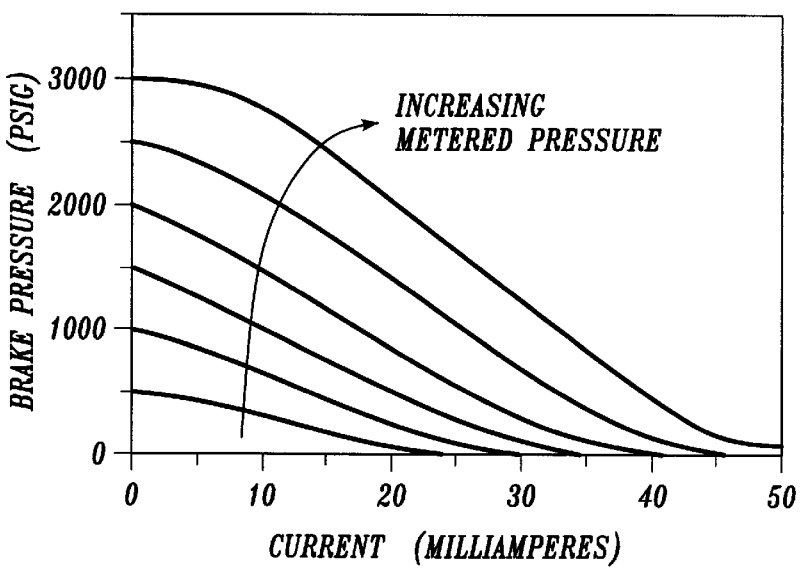
FIG. 4 is a brake pressure versus current diagram for a multigain antiskid hydraulic valve.

The logic merges after blocks 69 and 71. In the past, as shown at the bottom of FIG. 2 starting at block 73, the current value determined by the PBM antiskid control algorithm would be tested to determine if the antiskid current is above or below a PBM threshold. If transitioning above the threshold, a PBM high step is fired causing a high current to be applied to the antiskid hydraulic valves. Alternatively, the current value determined by the antiskid control algorithm is applied to the antiskid hydraulic valves. The high step is necessary because antiskid PBM control algorithms are slow to achieve a proper bias brake pressure value when brake pressure (autobrake or metered pressure) is applied. The high step instantaneously increases the integrator to the proper value. This type of control algorithm works satisfactorily with a unigain antiskid valve because a unigain antiskid valve is supplied with constant hydraulic pressure. As a result, brake pressure is a function of PBM control current. The brake pressure versus current characteristics of a unigain hydraulic valve is depicted in FIG. 3. While satisfactory for use with a unigain antiskid hydraulic valve, problems may occur when a brake system controlled by software that does not include the present invention is used with a multigain antiskid hydraulic valve. A multigain antiskid hydraulic valve receives pressure metered by the captain or first officer. As a result, brake pressure depends upon both PBM control current and pilot-metered pressure. The pressure versus current relationship of a multigain antiskid hydraulic valve is illustrated in FIG. 4. If antiskid control is initiated at low metered brake pressure, such as when an airplane is taxiing into an airport gate, releasing too much brake pressure when a high step "fires" may result in loss of braking. For example, a pilot metering 600 psig when a PBM high step fires could result in brake pressure being reduced to 200 psig, a value below a nominal brake contact pressure of 300 psig. This is undesirable. Such a problem does not occur with a unigain antiskid hydraulic valve because a PBM high step will not release brake pressure when metered pressure is low.

As illustrated in FIG. 2, the present invention solves the foregoing problem by increasing the PBM threshold at low speeds when momentary loss of braking control is most critical. First, at block 77, a test is made to determine if the wheelspeed is low enough to use the high PBM threshold. If the wheel speed is not low enough to use the high PBM threshold, the low PBM threshold is set. See block 79. If the wheel speed is low enough to use the high PBM threshold, the high PBM threshold is set. See block 81. Thereafter, as before, a test is made, at block 73, to determine if the antiskid current is above the PBM threshold. If the antiskid current is not above the PBM threshold, the PBM antiskid current value is output. If the antiskid value transitions from below to above the PBM threshold, the PBM high step current is output. While various wheelspeed values can be used to determine the break point, i.e., the point where the low to high threshold shift occurs, in one actual embodiment of the invention, the break point wheelspeed value was chosen to be 20 knots.

Figure 5:
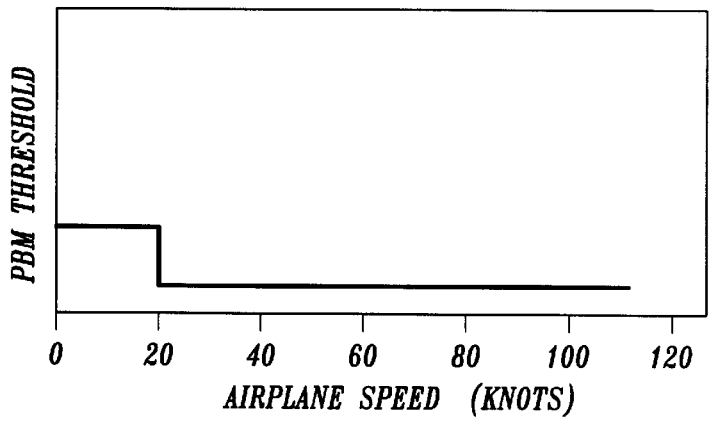
FIG. 5 is a graph of a PBM threshold versus airplane speed for antiskid control system software of the type illustrated in FIG. 2.

The dual-PBM threshold is illustrated in FIG. 5. The use of a dual-PBM threshold prevents the high step from firing at low speed unless a deep skid is occurring. A deep skid at low speeds will only occur if the metered pressure is high enough to prevent a complete loss of braking when a PBM high step fires. The PBM high step will still function at higher speeds, i.e., speeds above the low wheelspeed threshold.

As will be readily appreciated from the foregoing description, the invention provides antiskid control software that is ideally suited for use in connection with a multigain antiskid hydraulic valve. The antiskid control software generates a PBM threshold whose value is dependent on wheelspeed. A high value is set at low speeds and a low value is set at high speeds. The threshold is higher at low speeds to prevent a PBM high step from firing unless a deep skid is occurring.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. In an antiskid control system for a multigain hydraulic brake system that includes a multigain antiskid hydraulic valve, an integral-based pressure bias modulation control algorithm for producing an antiskid control current for application to said multigain antiskid hydraulic valve, and a pressure bias modulation high step current that overrides the antiskid control current when the antiskid control current exceeds a pressure bias modulation threshold, the improvement comprising dual pressure bias modulation thresholds, one threshold being active at low wheelspeeds and the other being active at high wheelspeeds.

2. The improvement claimed in claim 1, wherein the threshold is high at low wheelspeeds and low at high wheelspeeds.

* * * * *